United States Patent [19]
Brown

[11] Patent Number: 5,671,131
[45] Date of Patent: Sep. 23, 1997

[54] METHOD AND APPARATUS FOR DETECTING AN ISOLATED POWER SWITCH

[75] Inventor: Alan E. Brown, Georgetown, Tex.

[73] Assignee: Dell U.S.A. L.P., Austin, Tex.

[21] Appl. No.: 519,499

[22] Filed: Aug. 25, 1995

[51] Int. Cl.⁶ ................................................ H02H 7/122
[52] U.S. Cl. ............................ 363/56; 363/21; 363/97
[58] Field of Search .............................. 363/21, 49, 56, 363/97, 100, 131

[56] References Cited

U.S. PATENT DOCUMENTS

| | | | |
|---|---|---|---|
| 4,449,174 | 5/1984 | Ziesse | 363/21 |
| 4,593,346 | 6/1986 | Nooijen et al. | 363/21 |
| 5,499,184 | 3/1996 | Squibb | 363/100 |

*Primary Examiner*—Peter S. Wong
*Assistant Examiner*—Y. J. Han
*Attorney, Agent, or Firm*—Stanford & Bennett, L.L.P.

[57] ABSTRACT

A power switch detection system for a power supply including an operator-accessible power switch coupled to the secondary ground of the power supply and to one side of an isolation capacitor. The other side of the isolation capacitor is coupled to a switch detection circuit referenced to primary ground for detecting the state of the power switch through the isolation capacitor. The switch detection circuit controls a control circuit on the primary side based on the state of the power switch, where the control circuit correspondingly controls the power state of the power supply and a corresponding electronic device. In this manner, the power switch remains isolated by the isolation capacitor but controls the power state of the device. The control circuit controls conversion of AC power from an AC source coupled to the primary side through a transformer. Although the primary and secondary grounds are isolated from each other, a reference ground of the AC source and the secondary ground are coupled together, typically through a conductive chassis of the electronic device. This electrically conductive connection establishes a high impedance, low current path between the AC source and the isolation capacitor when the power switch is closed. A low frequency current signal from the AC source charges the isolation capacitor when the power switch is closed, which is detected by the switch detection circuit.

22 Claims, 3 Drawing Sheets

METHOD AND APPARATUS FOR DETECTING AN ISOLATED POWER SWITCH

FIELD OF THE INVENTION

The present invention relates to power supplies, and more particularly to a low cost, low power switch detection system for detecting the state of an isolated power switch of a power supply.

DESCRIPTION OF THE RELATED ART

Electronic devices including computer systems traditionally included a rather large, bulky and relatively expensive toggle power switch with a cable sub-assembly for turning on and off the device. The power switch was usually a mechanical device which directly connected or disconnected the AC mains or AC power source from the device to turn it on or off. A mechanical power switch directly disconnecting the AC source required a high current capacity cable sub-assembly and was very expensive. The switch itself was usually a more expensive, high current capacity double-pole, double-throw switch for disconnecting both of the AC terminals. The cable sub-assembly had to be insulated to meet product safety requirements, and usually conducted undesirable RF energy. Thus, the cable sub-assembly also had to be shielded. The resulting switch and cable sub-assembly was rather bulky and very expensive.

In many cases, a need arose to indirectly turn on and off the device upon the occurrence of other events or the assertion of various external signals, such as when a modem is activated, an alarm signal is generated, etc. The AC power must therefore remain accessible to automatically provide power to the device upon the occurrence of these events or signals. A mechanical switch disconnecting the AC source was unacceptable to achieve these functions, so that some means of detecting these events and for detecting a power switch for turning on and off the device was necessary.

Some manufacturers developed a low power, standby power source to eliminate the need for the costly and EMC complex method of switching the AC mains to control the power supply. In particular, a low power SELV (secondary extra-low voltage) source provided a low power or "flea power" signal to detection circuitry located on the secondary side of the power supply relative to the main power transformer. The term "SELV" is generally a product safety term that refers to circuitry carrying a maximum voltage level of 42 V peak to peak, which is located on the secondary side of the isolation boundary of the power supply. The SELV power source derived power directly from the AC source or from the relatively high DC input voltage from the primary side. The SELV power source also included isolation circuitry, such as a transformer or the like, to transfer the power to the secondary side and a regulation circuit for converting the power to a regulated low power signal, referred to as +5 VFP, which provided power to the detection circuit.

The detection circuit detected a signal from a power button or switch being manipulated or pressed by a user, where the power switch was referenced to the secondary ground for purposes of isolation. The detection circuit also monitored other signals for turning on the device, such as from a modem, alarm, etc., and correspondingly asserted an activation signal to the primary side through another isolation device, such as an optocoupler or the like. The second isolation device also required power from the SELV power source for correct operation. In response to the activation signal, the main control circuitry of the power supply was activated to turn on the electronic device. In this manner, the power switch, and thus the user, were isolated from the high voltage and high power signals of the primary side. This soft-start method required a separate and relatively expensive SELV power source and powered detection circuit to detect the isolated power switch.

It is desired to sense the status of an isolated, operator-accessible power switch without the need for the SELV standby power source and corresponding detection circuit. Such capability would reduce the cost of the overall supply and further increase the reliability by eliminating extraneous circuitry.

SUMMARY OF THE INVENTION

A power switch detection system for a power supply according to the present invention includes an operator-accessible power switch coupled to the secondary ground of the power supply and to one side of an isolation capacitor. The isolation capacitor, which is preferably a line-to-ground capacitor or "Y cap", complies with product safety certification requirements for appropriate isolation between the primary and secondary portions of the power supply. The other side of the isolation capacitor is coupled to a switch detection circuit referenced to primary ground for detecting the state of the power switch through the isolation capacitor. The switch detection circuit controls a control circuit on the primary side based on the state of the power switch, where the control circuit correspondingly controls the power state of the power supply and a corresponding electronic device. In this manner, the power switch remains isolated by the isolation capacitor but controls the power state of the device.

The control circuit controls conversion of AC power from an AC source coupled to the primary side through a main power transformer. Although the primary and secondary grounds are isolated from each other, the reference or "safety" ground of the AC source and the secondary ground are both coupled to a conductive enclosure or chassis of the electronic device, so that the reference and secondary grounds are effectively coupled together. This conductive chassis connection establishes a high impedance, low current path between the AC source and the isolation capacitor when the power switch is closed. A low frequency current signal from the AC source charges the isolation capacitor when the power switch is closed, which is detected by the switch detection circuit. In this manner, the isolation capacitor maintains the necessary isolation between the primary and secondary sides, but allows detection of the power switch without the need for an extra SELV power source transferring low power to the secondary side.

The switch detection circuit preferably includes a transistor having a current path coupled to a bulk capacitor of the primary portion of the power supply, and thus is powered directly by the primary portion. The control terminal of the transistor is coupled to the isolation capacitor for detecting or otherwise sensing the state of the power switch. The power switch itself is preferably a single-pole, single-throw (SPST) switch, which is less expensive and much simpler than an expensive and bulky mechanical-type toggle switch. In fact, all of the components in the preferred embodiment are relatively inexpensive for achieving a low cost detection system.

In the preferred embodiment, the transistor of the switch detection circuit conducts during a portion of each AC cycle when the power switch is closed, which discharges a sense capacitor of a charge circuit. The sense capacitor is initially charged through current from the bulk capacitors when the power supply is off. While charged, the sense capacitor activates a second transistor of the switch detection circuit, which removes the power to the primary side control circuit, which further turns off the power supply. When the power switch is closed and the sense capacitor is discharged by the first transistor, the second transistor is turned off allowing power to develop to the control circuit. The power supply and the electronic device are correspondingly turned on. When the power switch is opened or off, the first transistor stops conducting so that the sense capacitor is charged to turn on the second transistor. This removes power to the control circuit to turn off the power supply and thus the electronic device.

In the preferred embodiment, the isolation capacitor is coupled to a resistor-capacitor (RC) circuit connected to the gate of the first transistor, which is preferably a field-effect transistor (FET) or a metal-oxide semiconductor FET (MOSFET). The FET has its drain and source coupled to the sense capacitor and through a current limiting resistor across one of the bulk capacitors of the primary portion of the power supply. The sense capacitor is used to activate a second FET for grounding the power of a pulse width modulation (PWM) control circuit in the primary portion of the power supply. Thus, when the power switch is closed, the second FET is turned off allowing activation of the PWM circuit, which activates the power supply. When the power switch is opened to turn off the electronic device, the second FET grounds the voltage provided to the PWM circuit, which then shuts down the power supply for turning off the electronic device.

The present invention is implemented using relatively inexpensive components, thereby eliminating the need for a relatively expensive, standby SELV power source and powered detection circuitry for sensing the power switch. The isolation capacitor provides sufficient isolation between the user and the primary portion of the power supply, thereby meeting appropriate safety requirements. In this manner, the electronic device, such as a computer, can be turned on and off in a reliable manner without the need for an extraneous and relatively expensive standby power circuit commonly used today.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
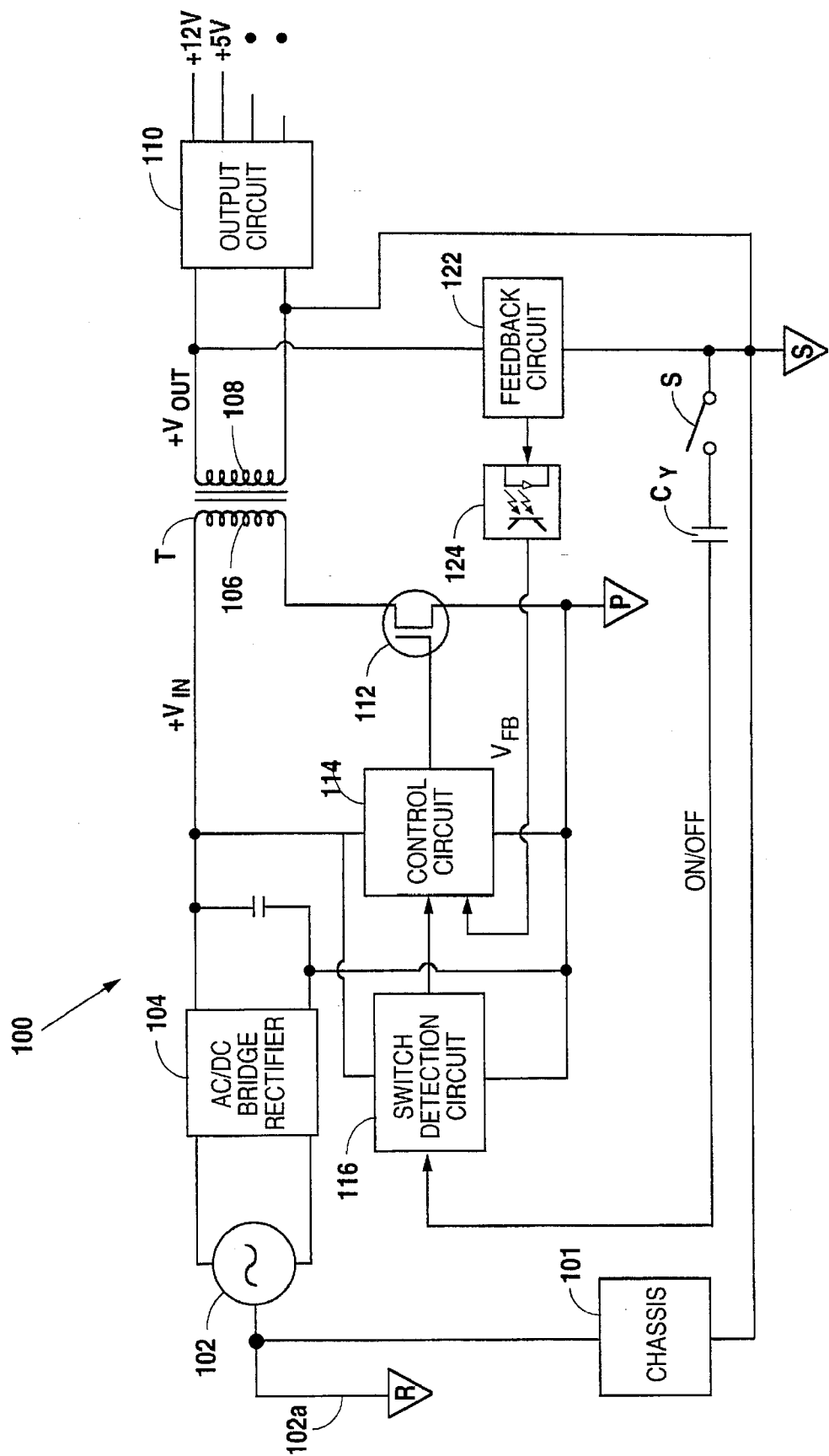
FIG. 1 is a simplified block diagram of a power supply system according to the present invention.

Referring now to FIG. 1, a simplified block diagram is shown of a power supply 100 including a power switch detection system according to the present invention. An AC source 102 is provided to the AC input terminals of a bridge rectifier 104, which converts an AC power signal from the AC source 102 to a relatively large and unregulated voltage signal, referred to as $V_{IN}$. The AC source 102 provides an AC power signal having a voltage of 115 V, 230 V or any other standard or non-standard voltage depending upon where the power supply 100 is used. The AC source 102 also includes a safety or reference ground terminal, referred to as the reference ground 102a. The reference ground 102a is isolated from, but serves as a voltage reference to, the AC power signal from the AC source 102. The reference ground is connected to a conductive metal enclosure or chassis 101 of an electronic device, such as a computer system (not shown), receiving power from the power supply 100. The term "chassis" as used herein refers to a conductive enclosure or element suitable for making an electrical connection, such as a metal chassis as opposed to a non-conductive plastic chassis or the like. The $V_{IN}$ signal is referenced to primary ground, which is ground for the primary portion of the power supply 100. The $V_{IN}$ signal is filtered across a relatively large bulk capacitor 105 coupled between the $V_{IN}$ signal and primary ground. The $V_{IN}$ signal is provided to one end of a primary inductor 106 of a transformer T, where the other end of the primary inductor 106 is provided through a switching transistor 112 to primary ground. The switching transistor 112 is preferably a metal-oxide semiconductor field-effect transistor (MOSFET) or the like, having its drain-to-source current path coupled between the inductor 106 and primary ground.

The switching transistor 112 includes a control terminal or gate which receives a modulated signal $V_P$ from a control circuit 114. The control circuit 114 is preferably a pulse width modulation (PWM) circuit for activating the switching transistor 112 on repetitive cycles for transferring current through the transformer T. The control circuit 114 preferably derives power from the $V_{IN}$ signal and is referenced to primary ground. The transformer T includes a secondary inductor 108, which develops a $V_{OUT}$ signal to the output circuit 110, which further provides the various DC voltage levels required for use by the electronic device. For example, the regulated DC signals may include a +12 V signal, a +5 V signal, etc. The secondary inductor 108 and the output circuit 110 are preferably referenced with respect to a secondary ground, which is preferably coupled to the chassis 101 of the electronic device. In this manner, a ground current path is established between the secondary ground and the reference ground 102a of the AC source 102.

In the preferred embodiment, a switch detection circuit 116 is connected to the control circuit 114 and also derives power from, and is coupled between, the $V_{IN}$ signal and primary ground. The switch detection circuit 116 turns on and off the control circuit 114 based on an ON-OFF signal received through an isolation capacitor $C_Y$. In fact, the switch detection circuit 116 is coupled to one side of the $C_Y$ capacitor through a conductor carrying the ON-OFF signal, where the other side of the capacitor $C_Y$ is connected to one terminal of a single-pole, single-throw (SPST) switch S. The other terminal of the switch S is connected to the secondary ground of the power supply 100.

The power supply 100 is powered off when the switch S is open. When the switch S is closed, the ON-OFF signal is asserted to the switch detection circuit 116. In particular, the isolation capacitor $C_Y$ is stimulated by a high impedance, relatively low frequency current signal from the AC source 102 through the chassis ground connection between the reference ground 102a and the secondary ground. The switch detection circuit 116 detects the ON-OFF signal and correspondingly activates the control circuit 114, which begins asserting the $V_P$ signal to the switching transistor 112. The transformer develops the $V_{OUT}$ signal to the output circuit 110. A feedback circuit 122 monitors the $V_{OUT}$ signal and provides a corresponding signal to an optocoupler 124, which develops a feedback voltage $V_{FB}$ provided to the control circuit 114. This establishes a control feedback loop so that the control circuit 114 continuously adjusts the $V_P$ signal to control the $V_{OUT}$ signal to the proper voltage level. The transformer T, the optocoupler 124 and the capacitor $C_Y$ provide the necessary isolation between the primary and secondary portions of the power supply 100 to meet safety specification standards.

When the switch S is opened, the ON-OFF signal is deasserted and the switch detection circuit 116 shuts down the control circuit 114. The control circuit 114 deasserts the $V_P$ signal, so that no current flows through the primary inductor 106 of the transformer T. The $V_{OUT}$ signal is not developed and the entire power supply 100 and the connected electronic device is shut down or otherwise turned off. It is appreciated that use of the simple switch S, the capacitor $C_Y$ and the switch detection circuit 116 allows control of the power state of the power supply 100.

The switch S is preferably a SPST switch, which maintains its state in the open or closed position after being pressed. The switch S is also preferably accessible by an operator for turning on and off the electronic device or computer system. The capacitor $C_Y$ preferably establishes an ulna low energy path when the switch S is closed, where the capacitor $C_Y$ complies with product safety certification requirements in a similar manner as capacitors used within the input filter circuitry of a power supply. Thus, the capacitor $C_Y$ provides the desired isolation from the primary portion of the power supply 100, while also allowing detection of the power switch S across the isolation boundary. A common name for line-to-ground capacitors within the input line filter is referred to as a "Y cap", where the capacitor $C_Y$ is a Y cap.

In prior art designs, a separate SELV power circuit would provide power through another transformer to power a detection circuit on the secondary side. The switch S would be connected directly to the powered detection circuit. Further, a separate isolation device, such as another transformer or optocoupler, would be required to send a signal back to the primary side for turning on the power supply. The SELV power source and corresponding detection circuitry are effectively eliminated in favor of a circuit according to the present invention.

Figure 2:
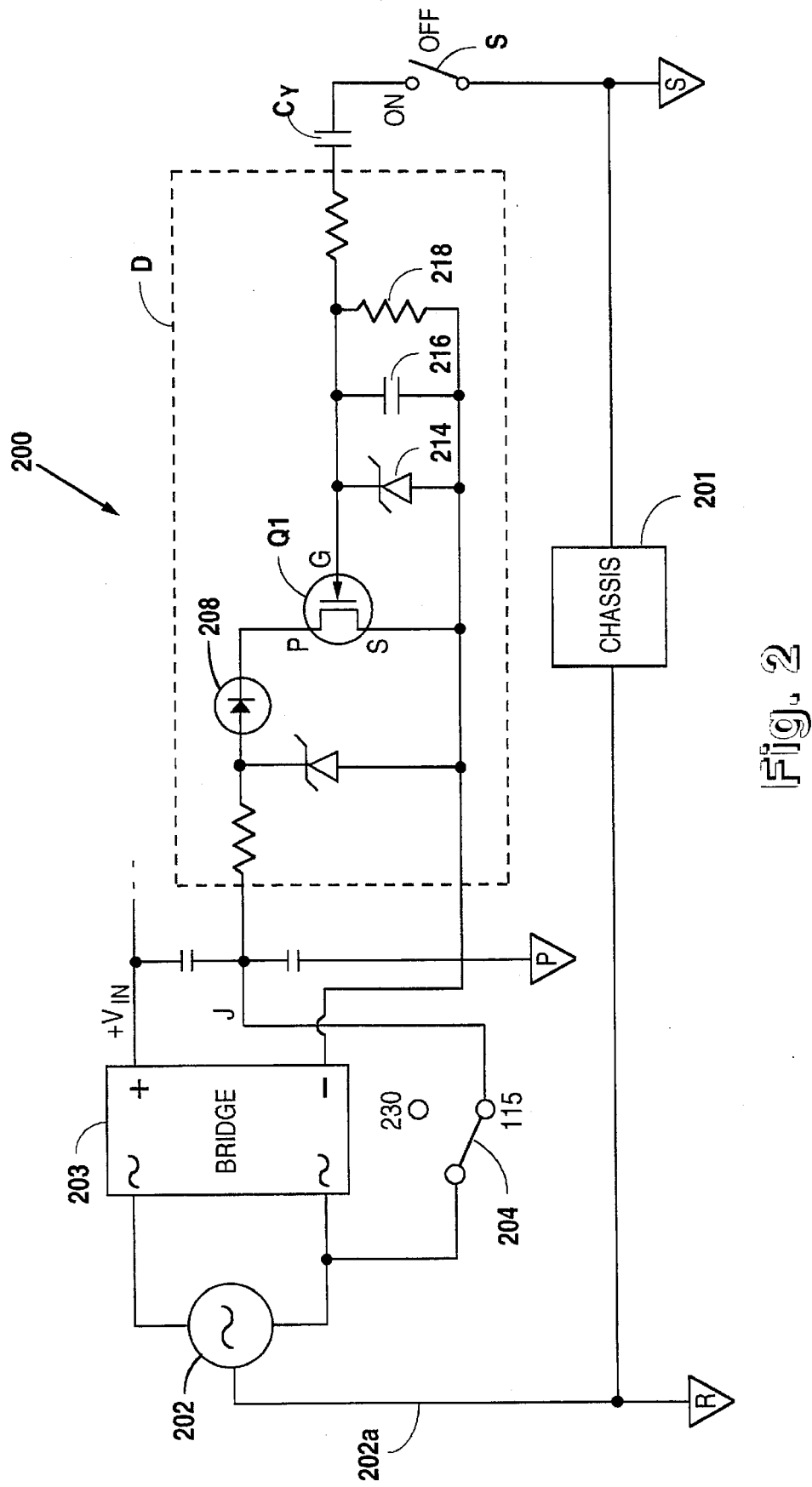
FIG. 2 is a more detailed schematic diagram of a power switch detection system according to the present invention.

Referring now to FIG. 2, a more detailed diagram is shown of a portion of a power supply 200 including a switch detection circuit D according to the present invention. Again an AC source 202 provides an AC input signal to the AC input terminals of a bridge rectifier 203, which full-wave rectifies the AC signal for providing a relatively large unregulated DC voltage referred to as $V_{IN}$. Also, the AC source 202 includes a reference ground terminal 202a, which is connected to a conductive chassis 201 of the electronic device powered by the power supply 200. In this case, however, the $V_{IN}$ signal is provided across two series-coupled capacitors C1 and C2 coupled in series between the $V_{IN}$ signal and primary ground. A switch 204 is coupled to the bridge rectifier 203 and to the junction J between the capacitors C1 and C2 for switching between 115 Vrms and 230 Vrms operation. When the AC input signal is 115 V, the switch 204 is placed in the 115 V position and the bridge rectifier 203 and the capacitors C1 and C2 act as a voltage doubler for asserting a peak voltage across each of the capacitors C1 and C2, which effectively doubles the peak voltage of the 115 V signal. If the input AC signal is 230 V, the switch 204 is placed in the 230 V position and the bridge rectifier 203 and the capacitors C1 and C2 act as a full wave rectifier for developing the peak voltage across both capacitors C1 and C2. In either case, the $V_{IN}$ signal has a voltage of approximately 325 VDC.

The junction J between the capacitors C1 and C2 is connected to one end of a resistor 206, having its other end connected to the anode of a light-emitting diode (LED) 208 and to the cathode of a 12 V Zener diode 212. The anode of the Zener diode 212 is connected to primary ground and the cathode of the LED 208 is connected to the drain of an N-channel enhancement MOSFET Q1, having its source connected to primary ground. The MOSFET Q1 is preferably a 2N7000 or a comparable transistor. The gate of MOSFET Q1 is coupled to the cathode of another 12 V Zener diode 214, to one end of a bypass capacitor 216, to one end of an optional current limit resistor 220 and to one end of another resistor 218. The anode of the Zener diode 214, the other end of the capacitor 216 and the other end of the resistor 218 are connected to primary ground and the other end of the resistor 220 is connected to one end of an isolation capacitor $C_Y$. The switch S has one terminal connected to secondary ground and its other terminal connected to the other end of the capacitor $C_Y$. The reference ground 202a of the AC source 202 is connected to the secondary ground through the chassis 201 forming a ground connection.

The resistors 206, 218 and 220, the Zener diodes 212 and 214, the capacitor 216, the MOSFET Q1 and the LED 208 form a switch detection circuit D. In the preferred embodiment, the resistor 220 is approximately 1KΩ, and the resistor 218 is approximately 2MΩ. The bypass capacitor 216 is a approximately 0.01 microfarads (μF) and the capacitor $C_Y$ is approximately 1000 pF, where the capacitive ratio of the capacitor 216 and the capacitor $C_Y$ is on the order of about ten (10). The optional resistor 220 serves to limit current to protect the Zener diode 214 when the switch S is first closed. The Zener diodes 212 and 214 are provided to limit the maximum voltage to protect the MOSFET Q1. The gate of the MOSFET Q1 preferably has a very high impedance and relatively low capacitance, such as approximately 50 pF, where the MOSFET Q1 is turned on relatively easily.

Operation of the switch S, the capacitor $C_Y$ and the detection circuit D is now described. When the switch S is in the open or off position, the gate of the MOSFET Q1 is open circuited so that the MOSFET Q1 is turned off. The LED 208 is turned off, indicating that the power supply 200 is turned off. In this case, a full 12 V develops across the Zener diode 212, which is used as a signal to a control circuit (not shown) within the power supply 200 to shut down the power supply and thus the electronic device.

When the switch S is in the closed or on position, current flows into the capacitor $C_Y$ from the common ground connection. This current is defined by the following equation (1):

$$i = (AC_{rms}) 2\pi f C_Y, \qquad (1)$$

where $AC_{rms}$ is 115 V, 230 V, 240 V, etc., f is the frequency of the AC source 202, and $C_Y$ is the capacitance of the capacitor $C_Y$. For example, if $AC_{rms}$ =240 V, f=50 Hz and $C_Y$=1000 pF, then the current i through the capacitor $C_Y$ is approximately 75 microamperes (μA). The gate of MOSFET Q1 correspondingly conducts during a portion of each AC cycle while the switch S is closed. The LED 208 is turned on and the voltage across the Zener diode 212 falls to the operating voltage of the LED 208, or to about 1.2 V. Again, the signal from the Zener diode 212 is used to activate or turn on the power supply 200 and thus the electronic device when its voltage goes to zero. In particular, the voltage across the Zener diode 212 is used as a signal to the control circuit in the primary portion of the power supply 200 for powering up and down the electronic device. It is important to note that the Zener diode voltage is determined by the state of the switch S as detected through the capacitor $C_Y$.

Figure 3:
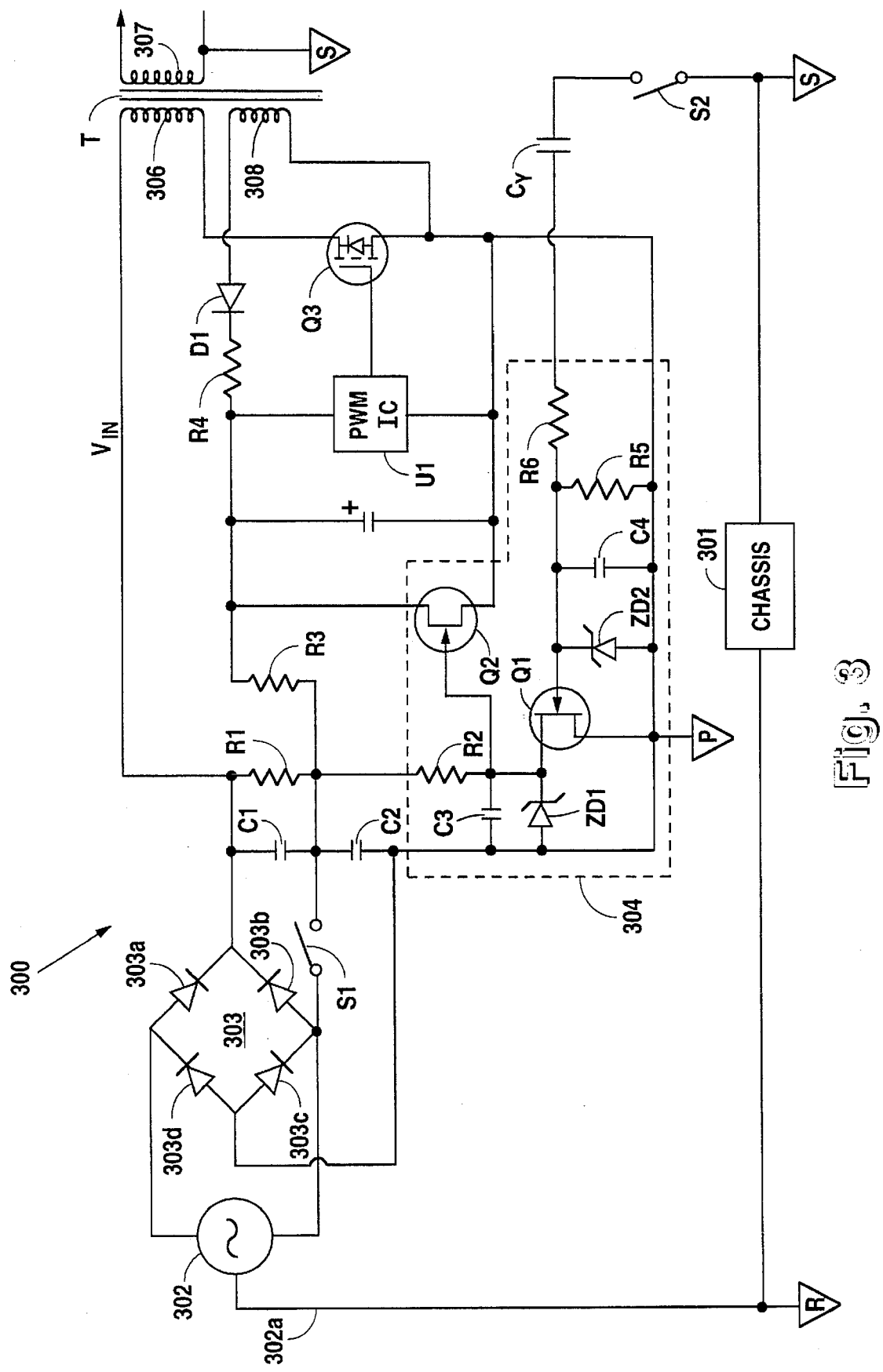
FIG. 3 is a more detailed diagram of an alternative embodiment of a power switch detection system according to the present invention.

Referring now to FIG. 3, a schematic diagram is shown of another power supply 300 illustrating a preferred embodiment of power switch detection system according to the present invention. Again, an AC input signal from an AC source 302 is supplied across the input terminals of a bridge rectifier 303, which is preferably a full-wave bridge circuit including diodes 303a, 303b, 303c and 303d coupled in bridge fashion. In particular, one AC terminal of an AC source 302 is provided to the anode of the diode 303a, having its cathode connected to the cathode of the diode 303b, having its anode connected to the cathode of the diode 303c, having its anode connected to the anode of the diode 303d, which has its cathode connected to the anode of the diode 303a. The other AC terminal of the AC source 302 is connected to the anode of the diode 303b. The AC source 302 also includes a reference ground 302a coupled to a conductive chassis 301 of the electronic device.

The capacitors C1 and C2 are coupled in series between the anode of the diode 303c and the cathode of the diode 303a for developing the input DC voltage $V_{IN}$. In the preferred embodiment, an SPST switch S1 is coupled between the anode of the diode 303b and the junction J between the capacitors C1 and C2. The switch S1 is opened for 230 V operation, where the AC input signal is full-wave rectified across the capacitors C1 and C2. The switch S1 is closed for 115 V operation, where the bridge rectifier 303 and the capacitors C1 and C2 serve as a voltage doubler. The $V_{IN}$ signal is connected to a start end of a primary inductor 306 of a transformer T, where the finish end of the primary inductor 306 is provided to the drain of an N-channel enhancement mode MOSFET Q3. The gate of the MOSFET Q3 receives a PWM control signal $V_P$ provided from a PWM integrated circuit U1 for controlling the output voltage of the power supply 300. The source of the MOSFET Q3 is connected to primary ground.

A resistor R1 is connected across the capacitor C1, having one end receiving the $V_{IN}$ signal and its other end connected to the junction J between the capacitors C1 and C2, to one end of a resistor R3 and to one end of a resistor R2. The other end of the resistor R3 is connected to the power input of a PWM circuit U1 and to one end of a filter capacitor C6, which has its other end connected to primary ground. The PWM circuit U1 is also referenced and connected to primary ground. The other end of the resistor R2 is connected to one end of a capacitor C3, to the gate of an N-channel enhancement mode MOSFET Q2, to the drain of another N-channel enhancement mode MOSFET Q1 and to the cathode of a 12 V Zener diode ZD1. The MOSFETs Q1 and Q2 are each preferably the 2N7000 or comparable bipolar or field-effect transistors. The other end of the capacitor C3, the anode of the Zener diode ZD1 and the source of the MOSFET Q1 are all connected to primary ground. The drain and source of the MOSFET Q2 are coupled across the capacitor C6. The gate of the MOSFET Q1 is connected to the cathode of another 12 V Zener diode ZD2, to one end of a capacitor C4, to one end of a resistor R5 and to one end of another resistor R6. The anode of the Zener diode ZD2, the other end of the capacitor C4 and the other end of the resistor R5 are all connected to primary ground.

The other end of the resistor R6 is connected to one side of an isolation capacitor $C_Y$, which is similar to the Y caps described in FIGS. 1 and 2. The other side of the capacitor $C_Y$ is connected to one terminal of a power switch S2, having its other terminal connected to secondary ground. Again, secondary ground is connected to the chassis 301 of the electronic device, creating an electrical connection to the reference ground 302a of the AC source 302.

The transformer T includes a tertiary inductor 308 wound in phase with the primary inductor 306, having its start end connected to the anode of a diode D1 and its finish end connected to primary ground. The cathode of the diode D1 is connected to one end of a resistor R4, having its other end provided to the power input of the PWM circuit U1. The transformer T also includes a secondary inductor 307 referenced to secondary ground and connected to an output circuit (not shown) of the power supply 300.

The power switch S2 is similar to the switch S described in FIGS. 1 and 2, where the designation S2 is used to distinguish it from the switch S1. The resistors R2, R5 and R6, the capacitors C3 and C4, the Zener diodes ZD1 and ZD2 and the MOSFETS Q1 and Q2 are collectively referred to as a power switch detection circuit 304. The Zener diode ZD1 protects the MOSFET Q2 by limiting its maximum gate voltage and the Zener diode ZD2 protects the MOSFET Q1 in a similar manner. In the preferred embodiment, the resistor R1 is approximately 75KΩ, and the resistors R2 and R3 are each approximately 150KΩ. The capacitor C3 is approximately 1 μF, the capacitor C4 is approximately 0.01 μF and the capacitor $C_Y$ is approximately 1000 pF. The capacitor CY preferably has a voltage rating of approximately 3 KV. The resistor R5 is approximately 510KΩ and the resistor R6 is approximately 1KΩ.

Operation of the power supply 300 is now described. When the switch S2 is opened or in its off position, the gate of the MOSFET Q1 is open-circuited through the resistor R6 so that the MOSFET Q1 is turned off. The $V_{IN}$ signal developed across the capacitors C1 and C2 causes a current through resistor R2 to charge the capacitor C3 to 12 V, limited to 12 V by the Zener diode ZD1. Since the MOSFET Q1 is off, the capacitor C3 charges to 12 V, which turns on the MOSFET Q2. The MOSFET Q2 discharges the capacitor C6, which thereby removes all power provided to the PWM circuit U1. The PWM circuit U1 is shut down so that the $V_P$ signal remains grounded or otherwise deasserted and the MOSFET Q3 remains turned off. Thus, no current flows through the primary inductor 306, so that the transformer T, the power supply 300, and thus the electronic device are all turned off.

When the switch S2 is closed or in the on position, the MOSFET Q1 conducts during a portion of each AC cycle in a similar manner as described above for FIG. 2. In particular, a current as defined in equation (1) above flows through the capacitor $C_Y$. Since the MOSFET Q1 is oscillating with the AC signal, the capacitor C3 filters out the chopping action of the drain of the MOSFET Q1. The capacitor C3 is discharged by conduction of the MOSFET Q1, so that the MOSFET Q2 is turned off. The $V_{IN}$ signal charges the capacitor C6 through the resistors R1 and R3 to enable the PWM circuit U1. Once the PWM circuit U1 begins operating, it asserts the $V_P$ signal to the MOSFET Q3 to begin modulated current through the transformer T, thereby taming on the power supply 300 and thus the electronic device. A voltage also develops across the tertiary inductor 308 for providing power through resistor R4 to the PWM circuit U1. Thus, the tertiary inductor 308 and the diode D1 through the resistor R4 supplies operating current for the PWM circuit U1 after startup and during normal operation. Again, to turned off the power supply 300, the switch S2 is opened, thereby turning off the MOSFET Q1, allowing the capacitor C3 to charge. The MOSFET Q2 is turned on, grounding the capacitor C6 and shutting down the PWM circuit U1.

It is now appreciated that a power switch detection system according to the present invention eliminates the need for a separate and relatively expensive constant standby SELV power source and detection circuitry to detect the state of an isolated power switch. According to the present invention, the power switch is coupled to secondary ground and is isolated from the primary through an isolation capacitor. The isolation capacitor is a Y cap meeting product safety certification requirements to reduce the risk of electrical shock to the user. A switch detection circuit is coupled to the other side of the isolation capacitor for detecting the power switch and correspondingly controlling the power state of the power supply and electronic device. The reference ground of the AC source and the secondary ground are coupled together through a conductive chassis of the electronic device or the power supply itself. This provides a current path for enabling the switch detection circuit to detect the state of the power switch. The switch circuit is powered directly from the primary side circuitry and is implemented in a very simple manner. The standby SELV low power circuitry and detection circuit are thereby eliminated.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A power switch detection system for detecting a user-accessible power switch of a power supply having a primary referenced to a primary ground, the primary portion including a control circuit for controlling the conversion of an AC signal from an AC source through a transformer to a secondary portion referenced to a secondary ground, the power switch referenced to the secondary ground and the AC source including a reference ground terminal coupled to the secondary ground, said power switch detection system comprising:

an isolation capacitor having a first side for coupling to said power switch and a second and a switch detection circuit referenced to the primary ground, coupled to said second side of said isolation capacitor and for coupling to the control circuit that detects current flow through said isolation capacitor and correspondingly turns on and off the control circuit.

2. The detection system of claim 1, wherein the control circuit comprises a pulse width modulation circuit for modulating current through a primary inductor of a transformer for transferring power between the primary and secondary portions.

3. The detection system of claim 1, wherein the power switch comprises a single-pole, single-throw switch.

4. The detection system of claim 1, wherein said isolation capacitor is a Y cap.

5. The detection system of claim 1, wherein the primary portion develops a DC input voltage, and wherein said switch detection circuit comprises:

a first switch for coupling to the control circuit for controlling power to the control circuit;

a charge circuit coupled to said first switch and for receiving the DC input voltage;

a second switch coupled to said charge circuit for charging and discharging said charge circuit; and a resistor-capacitor circuit coupled to said second switch and for coupling between said isolation capacitor and the primary ground for controlling the state of said second switch based on the state of the power switch.

6. The detection system of claim 5, wherein said first and second switches comprise field-effect transistors.

7. The detection system of claim 5, wherein said charge circuit includes a capacitor coupled to receive the DC input voltage.

8. The detection system of claim 7 wherein said charge circuit further comprises:

a resistor coupled to said capacitor and receiving the DC input voltage for charging said capacitor.

9. The detection system of claim 5, wherein said resistor-capacitor circuit comprises a resistor and a bypass capacitor for coupling in parallel between the primary ground and a control terminal of said second switch.

10. The detection system of claim 9, wherein said bypass capacitor has approximately ten times the capacitance of said isolation capacitor.

11. The detection system of claim 5, wherein said resistor-capacitor circuit comprises:

a current limit resistor having a first end coupled to said isolation capacitor and having a second end;

a second resistor having one end coupled to said second end of said first resistor and a second end for coupling to the primary ground; and a capacitor having a first end coupled to said second end of said first resistor and a second end for coupling to primary ground.

12. The detection system of claim 5, further comprising:

a Zener diode coupled to a control terminal of said second switch.

13. A power supply for converting an AC signal from an AC source having a reference ground, comprising:

a rectifier circuit for coupling to the AC source for converting the AC signal to a DC input signal referenced to a primary ground;

a transformer and converter circuit coupled to said rectifier circuit for converting said DC input signal to at least one regulated output signal referenced to a secondary ground, said secondary ground for coupling to the reference ground of the AC source;

a control circuit coupled to said rectifier circuit and said transformer and converter circuit for controlling conversion of power through said transformer;

an operator-accessible power switch having an on and an off state coupled to said secondary ground;

an isolation capacitor having a first side coupled to said power switch and a second side; and a switch detection circuit referenced to said primary ground and coupled to said second side of said isolation capacitor, to said rectifier circuit and to said control circuit that detects the state of said power switch through said isolation capacitor and correspondingly turns on and off the power supply by turning on and off said control circuit.

14. The power supply of claim 13, wherein said power switch comprises a single-pole, single-throw switch which couples said first side of said isolation capacitor to said secondary ground when closed.

15. The power supply of claim 14, wherein said switch detection circuit is referenced to primary ground and detects current flow through said isolation capacitor when said power switch is closed.

16. The power supply of claim 15, wherein said switch detection circuit comprises:

a transistor circuit having a control terminal coupled to said isolation capacitor, said transistor circuit being turned on when said power switch is closed.

17. The power supply of claim 16, wherein said switch detection circuit further comprises:

a charge circuit coupled to said transistor circuit and said rectifier circuit, wherein said charge circuit receives charging current from said DC input voltage while said transistor circuit is turned off, and wherein said transistor circuit discharges said charge circuit when turned on.

18. The power supply of claim 17, wherein said switch detection circuit further comprises:

a second transistor circuit coupled to said charge circuit and said control circuit for controlling the power state of said control circuit.

19. The power supply of claim 18, wherein said first and second transistor circuits each include a field-effect transistor, and wherein said isolation capacitor comprises a Y cap.

20. The power supply of claim 13, wherein said secondary ground is electrically connected to the reference ground through a conductive chassis.

21. A method of detecting a power switch referenced to a secondary ground of a power supply, the power supply converting power from an AC source having a reference ground through a primary portion referenced to a primary ground which is isolated from the secondary ground, comprising the steps of:

isolating the power switch from the primary portion through an isolation capacitor;

monitoring current through the isolation capacitor using a switch detection circuit referenced to the primary ground; and the switch detection circuit activating a control circuit to turn on the power supply when current is detected by the switch detection circuit.

22. The method of claim 21, wherein said monitoring step comprises the step of:

activating a transistor circuit referenced to primary ground when the power switch couples the isolation capacitor to secondary ground.

* * * * *